Figure 4:
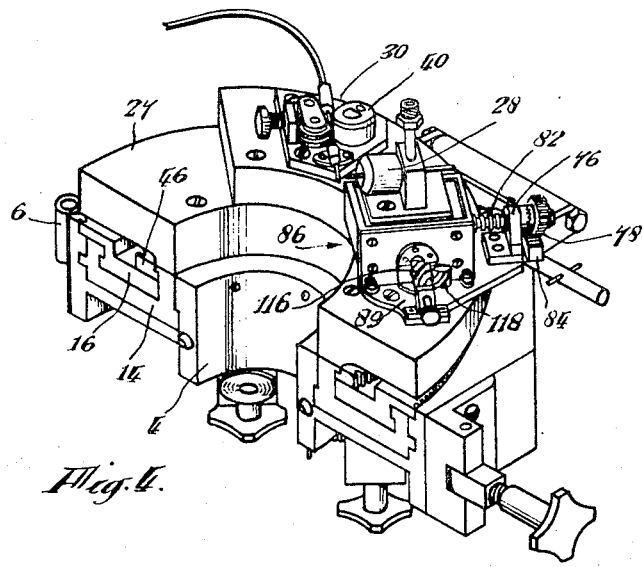

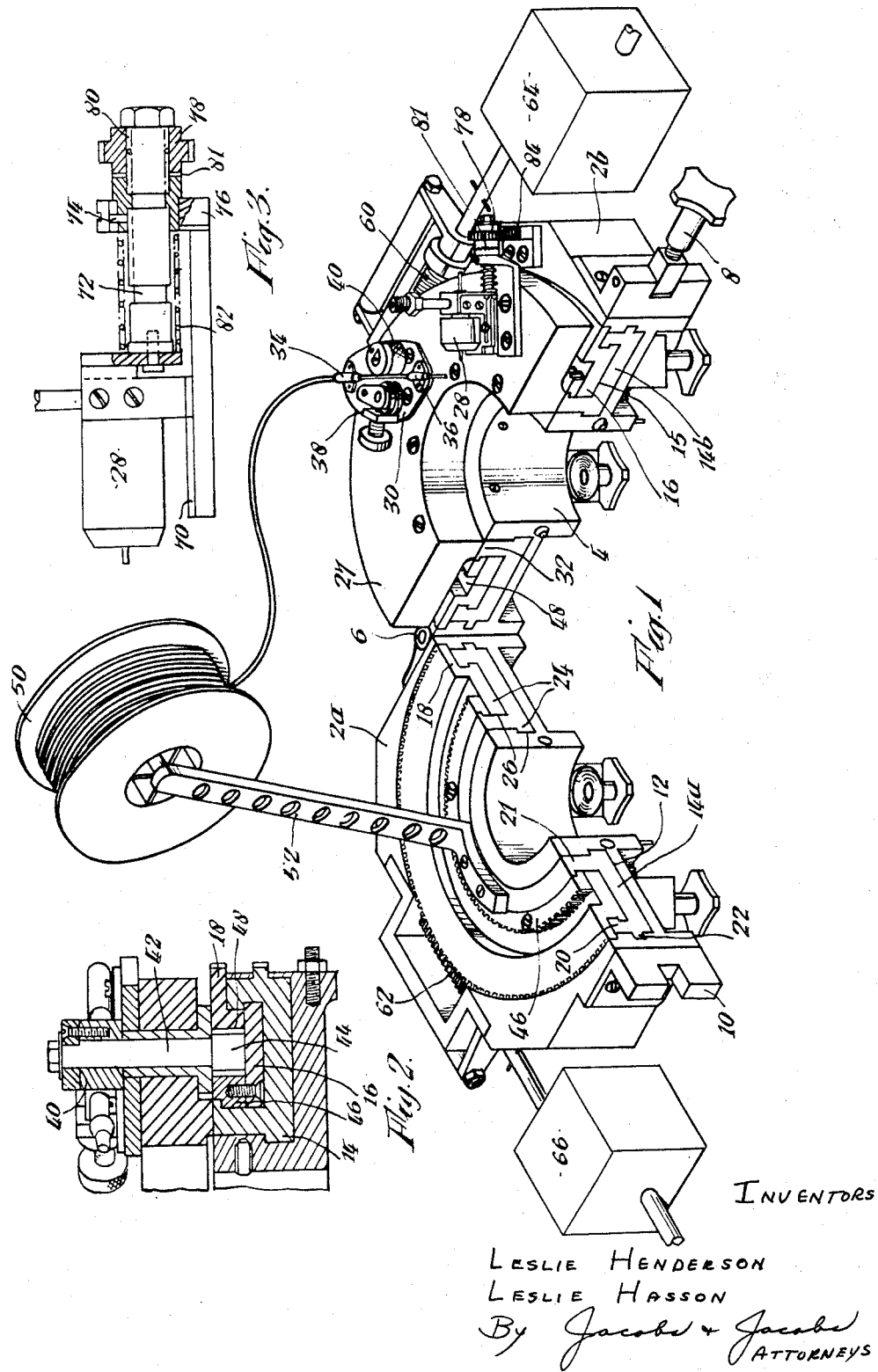

Nov. 5, 1968 L. HENDERSON ETAL 3,409,752

ORBITAL WELDING APPARATUS

Filed Nov. 14, 1966 3 Sheets-Sheet 2

INVENTORS
LESLIE HENDERSON
LESLIE HASSON
By Jacobs & Jacobs
ATTORNEYS

INVENTORS
LESLIE HENDERSON
LESLIE HASSON
By Jacob + Jacobs
Attys.

United States Patent Office 3,409,752
Patented Nov. 5, 1968

3,409,752
ORBITAL WELDING APPARATUS
Leslie Henderson, Whitley Bay, and Leslie Hasson, Wrekenton, Gateshead, England, assignors to Clarke, Chapman & Co. Limited, Gateshead, England, a company of Great Britain and Northern Ireland
Filed Nov. 14, 1966, Ser. No. 593,829
Claims priority, application Great Britain, Nov. 15, 1965, 48,465/65
16 Claims. (Cl. 219—60)

This invention relates to welding apparatus, and particularly to orbital welding apparatus for the external butt welding of lengths of circular-section tubing. In such apparatus it is known for the welding tool to be carried on one-half of a diametrically divided drive ring mounted for rotation in a track formed in a clamp comprising a similarly divided bore. When the lines of division of the drive ring and clamp are in alignment, the clamp may be opened and then closed around two sections of tubing to be welded together. The drive ring must also carry means for guiding the consumable welding wire to a position between the welding electrode and the tubing. This wire has, in the past, been fed from a reel towards the workpiece by drive means located either at the reel or at some other point removed from the welding head, and this has given rise to feeding inaccuracies.

According to the present invention, there is provided orbital welding apparatus comprising a clamp having a bore to embrace a length of tubing and being divided diametrically across said bore, there being mounted on the clamp adjacent each other, two diametrically divided drive rings rotatable about the bore axis, a first of the rings carrying a welding head and the second drive ring being connected to feed means to feed a welding wire to the vicinity of said head.

Preferably the wire feed means is mounted upon the first drive ring to rotate therewith and the two rings have respective drive means at least one of which may be varied in speed relative to the other. With this arrangement, when the two drive rings are driven at the same angular velocity no rotation is transmitted to the feed rollers so that no wire feed occurs. If now the angular velocity of one drive ring is made to differ from that of the other drive ring so that the second ring is rotating faster than the first, the feed roller is driven through the gearing from the second drive ring and can thus feed welding wire towards the workpiece. Location of the wire feed roller so close to the workpiece gives much more accurate feed than was previously possible.

Preferably the two drive rings have similar external diameters and are axially spaced on the clamp. This simplifies the manufacture and assembly of the apparatus. Each drive ring is preferably formed with teeth meshing with the respective drive means, although friction, belt or chain drive onto the drive rings is possible.

Further preferred features of the invention facilitate the use of the apparatus to fill weld grooves of different widths and/or depths.

Thus, for the purpose of varying the width of deposit in a weld run, apparatus according to the invention may have the welding head so mounted on its ring as to be oscillatable longitudinally of the clamp bore. Such oscillation may be controlled by cam means between the welding head and a shaft receiving a drive input from said second ring and preferably means are provided for the interchangeable engagement of respective ones of a series of differently formed cams to vary the amplitude of the oscillations.

The cam means between the shaft and the welding head may take the form of an elongated slot in a part of the welding head and a number of barrel cams eccentrically mounted on the shaft, each one of the cams being engageable in the slot. The cams are each designed to impart a different required amplitude of oscillation to the head when fitted into the slot, i.e. the eccentricities of the cams differ one from the other. Preferably the cams are axially spaced on the shaft, which has means whereby it may be located in different spaced positions relative to the welding head so that the required one of the cams is held in position in the slot.

The gearing between the shaft and the second drive ring may take the form of a series of splines on the shaft meshing with a gear wheel driven either directly or through further gearing from a wheel engaged by the second drive ring. If the second drive ring is toothed, the wheel is then a pinion contacting it.

When relatively deep weld grooves are to be filled it is convenient to do this by depositing successive layers of weld metal in the groove, the welding head being moved radially away from the groove as each layer is completed to deposit a further layer on the preceding one. The invention may therefore also provide means whereby the welding head is displaceable radially of the bore and means are provided to effect said displacement in co-ordination with the rotation of the first ring, said means preferably being arranged to operate intermittently at each revolution of the first ring.

Thus, the welding head may be mounted on a carriage secured to the first drive ring, the mounting being such as to allow the welding head to slide relatively to the carriage substantially radially to the tubes being welded and this radial movement of the welding head can be effected through a threaded connection between the welding head and a spur wheel mounted for rotation about an axis radial to the drive ring centre, the spur wheel being engageable with one or more stationary projections such as dog-teeth fixed on the clamp.

It will readily be seen that on rotation of the first drive ring relative to the clamp the spur wheel will engage the dog-teeth intermittently and so be rotated and the threaded connection will convert this rotation into a translational movement of the welding head. The number of dog-teeth and the pitch of the threaded connection are designed so that on each complete revolution of the first drive ring the axial movement of the welding head is equal to the thickness of the weld metal deposited during each revolution.

The threaded connection between the welding head and the spur wheel preferably comprises a rod, connected at one end to the head in such a way as to allow the head to move transversely to the rod so that the cam means act independently on the head, and connected at the other end to the spur wheel. The threads of the connection may be formed either between the spur wheel and the rod, or between the rod and the head.

Preferably the rod has a quickthread part engaging in a quickthreaded internal bore of the spur wheel, and the rod is carried by a supporting member on the first drive ring. This support and the radially inner side of the spur wheel facing it are formed with co-acting clutch parts and the clutch part on the spur wheel is spring biased into engagement with the clutch part on the support. The spur wheel and thus the rod are usually positively held against rotation, so that the welding head is locked in its axial position, but when the spur wheel comes into engagement with the dog-teeth the spring loading allows the clutch part on the spur wheel to over-ride the clutch part on the support so that the clutch slips as the axial position of the welding head is adjusted.

Figure 5:
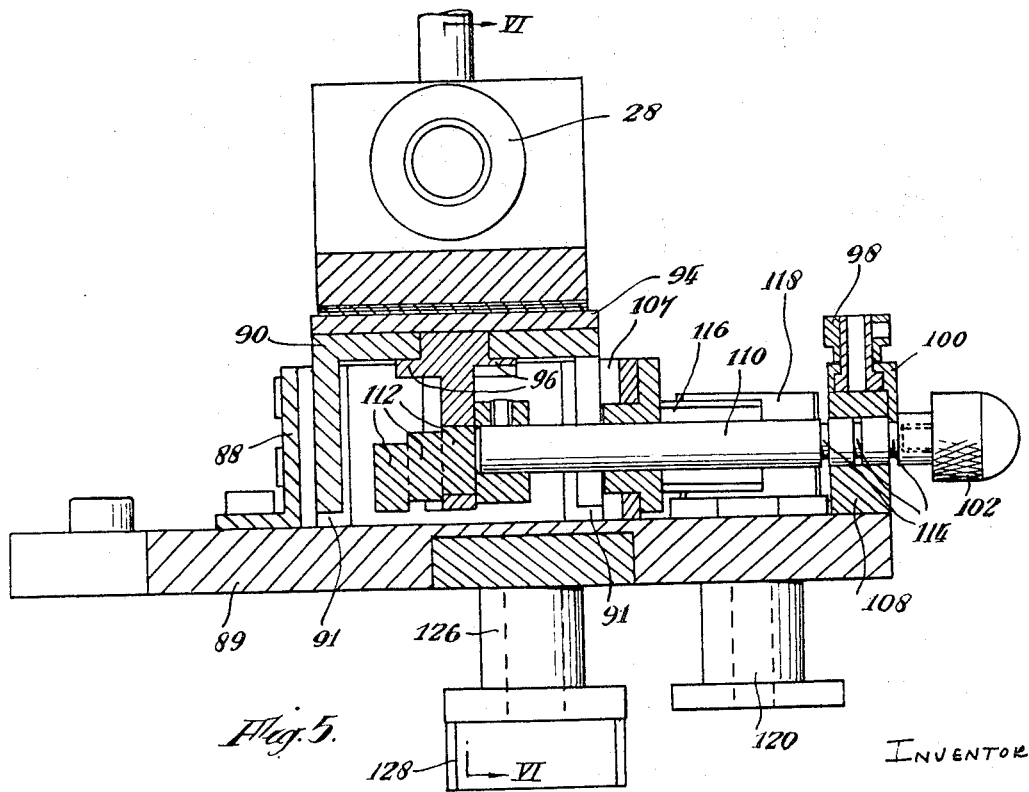
Figure 6:
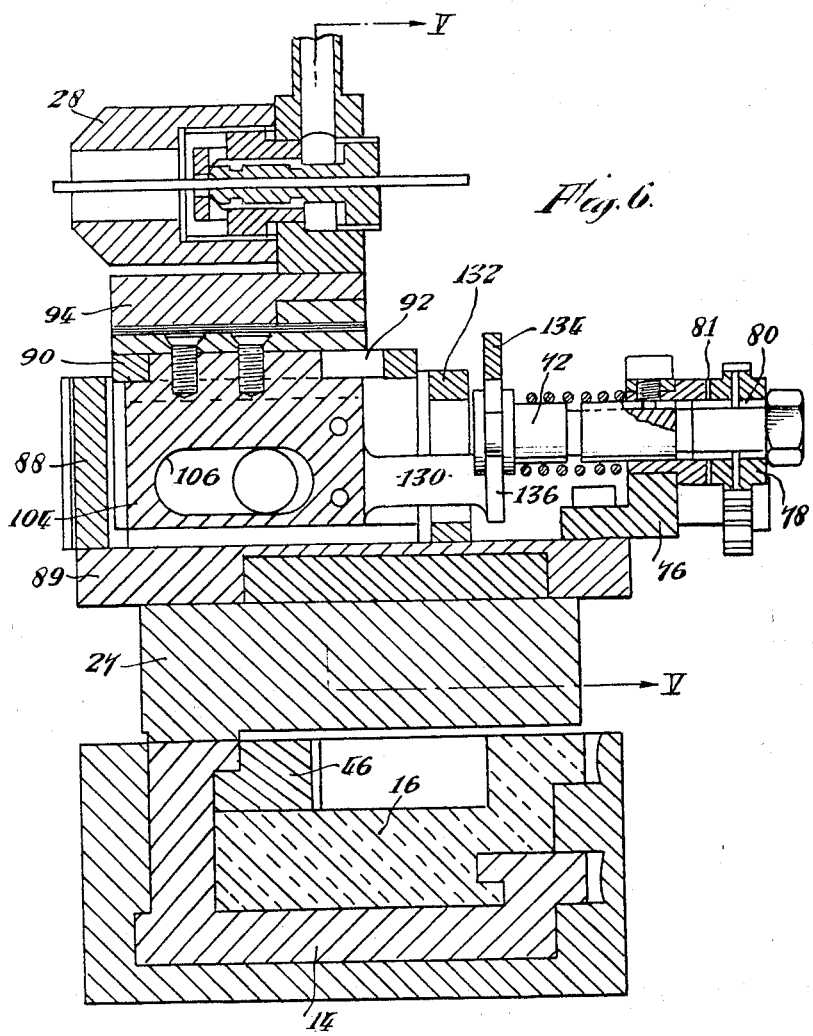
Figure 7:
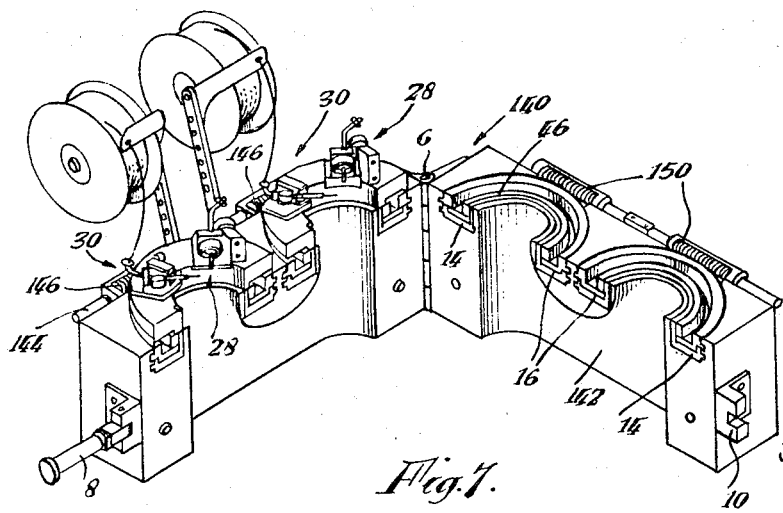

The invention will be more particularly described with reference to the accompanying drawings, wherein:

FIG. 1 shows a first form of apparatus according to the invention,

FIGS. 2 and 3 show details of the welding wire feed and welding head radial movement mechanism respectively in the apparatus in FIG. 1, FIG. 4 shows a modified form of the apparatus in FIG. 1, FIGS. 5 and 6 show details of the apparatus in FIG. 4 on the mutually perpendicular section lines V—V and VI—VI, and FIG. 7 illustrates apparatus according to the invention for the welding of a U-tube to a pair of parallel tubes.

Referring more particularly to FIG. 1, clamp 2 comprises diametrically split parts 2a, 2b defining the two halves of a bore 4. The parts are shown swung open about hinge 6 and are securable together when closed by locking bolt and tongue 8, 10. The clamp has an annular groove 12 concentric with the bore within which the two diametrically split halves 14a, 14b of a first drive ring 14 are located. The drive ring 14 has a similar, smaller annular groove 15 in its upper surface and this receives a second drive ring 16 which is likewise split diametrically into two halves.

The second drive ring is formed with a radially outwardly projecting flange 18 overlapping and projecting radially beyond an outer raised rim 20 of the first or lower ring, the surface of the flange 18 and the upper surface of an inner raised rim 21 of the lower ring being substantially coplanar. Both rings have toothed drives, the teeth of the first drive ring being formed round the circumference of a flange 22 projecting radially from the circumferentially outer surface of the outer rim 20, while the teeth of the second drive are formed round the circumference of the projecting flange 18 of this ring. The annular grooves in both the clamp and the lower drive ring, and those parts of the lower and upper drive rings respectively that are seated in these grooves are formed with radially extending ribs 24 and grooves 26 to locate the respective parts against relative axial displacement.

An arcuate support 27 carrying a welding head 28 and wire feed means 30 is bolted to the upper surface of radially inner flange 32 of the lower drive ring, and projects radially outwardly over the upper drive ring and above the upper surface of this. This disposition of the parts leads to small overall dimensions.

The wire feed means 30 comprise two tubular guides 34, 36, each having a nozzle tapering inwardly towards the exit end of the guide, one guide 34 being positioned ahead of, and the other guide 36 after, a pair of opposed wire feed rollers 38, 40 of which the roller 40 is driven by gearing from the second drive ring. The nozzle of the guide 36 is directed towards the space between the tip of the welding electrode and a tubular workpiece held in the clamp.

The gearing between the driven feed roller and the second drive ring 16 comprises a spindle 42 having the roller 40 fixed to its upper end and a pinion 44 to its lower end. The pinion 44 engages a gear ring 46 toothed on its radially outer face, and secured to the upper surface of the second drive ring with the upper surface of the gear ring substantially coplanar with the upper surface of the outwardly projecting flange 18 of the second drive ring. An annular space 48 between the teeth of the gear ring and the radially inner margin of the flange accommodates the pinion 44.

Wire entering the guide 34 ahead of the wire feed rollers is drawn from a reel 50 which may be separate from the apparatus, but which is shown mounted by an arm 52 to the first drive ring 14 to rotate therewith. When the reel is thus mounted on the apparatus, its dimensions must usually be such that it lies wholly within the projection of the radial limits of the welding head and wire feed apparatus in a direction parallel to the axis of the clamp, so that there is no danger of the reel fouling a tube being welded while the welding head is being driven round the tube.

The drive means to each of the drive rings 14, 16 includes respective worms 60, 62 meshing with the gear-toothed flanges 22, 18 respectively, the two worms being mounted at opposite sides of the clamp. The worms can be coupled through transmissions to a suitable common motor or to two separate motors. In the case of the drive means to the first drive ring, i.e. that for the welding head, the transmission includes means 64 indicated purely diagrammatically for controlling the speed so that the rate of travel of the head round the tube may be varied. The second transmission also includes speed control means 66, again shown diagrammatically, preferably of infinitely variable form, so that the second drive ring, i.e. that for the wire feed roller can be driven at the same angular velocity as the first drive ring to give no wire feed, or at a controlled different angular velocity to feed wire at any required speed. One of the transmissions may also include an escapement such that rotation of the first drive ring at a higher angular velocity than the second is prevented. If this were permitted in the illustrated construction the effect would be to drive the wire feed roller in such a direction as to move the wire away from the electrode and thus to unthread it from the guides.

The apparatus shown in FIG. 1 also includes means for withdrawing the welding head as each circumferential weld run is completed so that a succeeding run can be laid on top of this with the welding electrode similarly spaced from the work surface.

As is more clearly shown in FIG. 3, the means comprise a slideway 70 fixed to the support 27 and carrying the welding head 28 so that it is movable radially of the clamp bore. A rod 72 is secured to the head and has a slot and pin engagement 74 in a bore in an end bracket 76 integral with the slideway 70 so that rotation of the rod is prevented. Adjacent its outer end, the rod carries a spur wheel 78, a quick thread connection 80 being provided between them and fixed to the brackets 76 and spur wheel 78 respectively are the two halves of a slip clutch 81, these taking the form of meshing toothed discs. A spring 82 between the welding head and the bracket urges the welding head radially inwardly and tends to hold the clutch parts in engagement so that the spur wheel 78 will not freewheel.

Located in the path of the spur wheel 78, as it rotates with the first drive ring 14, is a group of dogteeth 84 (FIG. 1) secured to the clamp 2. When the spur wheel engages the dog-teeth the torque applied to it is sufficient to overcome the force of the spring 82 and cause the clutch to slip so that the spur wheel rotates. The rod 72 cannot rotate, however, because of the sliding connection 74. The quickthread 80 between the rod and the spur wheel therefore causes axial displacement of the rod and the welding head is thereby drawn radially outwardly. Such a displacement takes place at each complete revolution of the first drive ring 14.

Referring now to the embodiment illustrated in FIG. 4, the arrangement of the clamp halves and drive rings is similar to that shown in FIG. 1 as is also the drive to the wire feed means. Thus, only one half of the apparatus is shown, this containing the major difference in construction over the earlier embodiment, namely, the mounting of the welding head 28.

As in the previous example, the welding head is mounted to the support 27 but carriage 86 interconnecting this parts is arranged to allow movement of the welding head both radially and axially of the clamp bore.

The carriage for the welding head comprises a rectangular, open-topped box-like structure 88 projecting from a mounting plate 89. Within the structure 88 there fits an inverted channel section member 90 having a rectangular slot 92 centrally of its web. The welding head 28 is fixed to the upper surface of a block 94 that has a tongue 104 projecting through the slot 92. Wing portions 96 prevent upwards displacement of the tongue from the slot and its only permitted movement is therefore longitudinally of the slot.

The channel member 90, however, has its flanges seated in opposed recesses 91 in the side walls of the structure 88 so that the member and welding head can move vertically as a unit. Control of this movement is effected by cam means.

In the lower region of the tongue a horizontal cam slot 106 is formed extending parallel to the axis of the welding head 28, i.e. radially of the drive rings 14, 16. Also secured to the mounting plate 89 is a bearing trunnion 108 for a shaft 110 extending transversely to the length of the slot 106 and projecting into the slot through a space 107 in a side wall of the structure 88. The end of the shaft so located carries three barrel cams 112 eccentric to the shaft, the degree of eccentricity varying by one eighth of an inch between adjacent cams and the diameter of each cam being such that it is a close fit within the slot.

In the region of the trunnion 108, the shaft 110 has three spaced grooves 114 and a locking screw 98 on the trunnion is able to secure a half circlip locating device 100 in a groove positioned at the outer face of the trunnion. The outermost end of the shaft 110 carries a finger grip 102 and by this means it is possible to slide the shaft axially in its trunnion to bring a required one of the grooves to the locating device position. The effect of this is to move the cams 112 transversely of the slot 106 so that a different cam is engaged in the slot as each groove is engaged by the device 100 to fix the axial position of the shaft 110.

Inwardly of the grooves 114 the shaft carries a helical gear wheel 116 which meshes with a helical gear wheel 118 carried at the upper end of a further shaft 120 extending through the support 27 parallel to the axis of the drive rings. This further shaft also carries a spur wheel (not shown) directly below the gear wheel 118, which spur wheel meshes with a further spur wheel (not shown) on the upper end of a parallel shaft 126 also extending through the support plate 27. The shaft 126 carries at its lower end a pinion 128 engaging with the gear ring 46 secured to the upper surface of the second drive ring 16. As in the first-described embodiment, the pinion 44 is also located in the annular space between the gear ring 46 and the flange 18 to mesh with the teeth of the gear ring.

In the manner already described with reference to the drive to the wire feed means, when the two rings 14, 16 are rotated at different angular velocities the pinion 128 will rotate to transmit rotation through the gearing connecting it to the shaft 110 carrying the cams 112 and rotation of this shaft will cause the particular cam engaged in the slot 106 to oscillate the welding head parallel to the axis of the drive rings. The amplitude of oscillation is selected by engaging the appropriate cam in the slot to cause the head to move back and forth across the full width of a prepared weld groove, so that the whole of the groove is filled with weld metal.

It has already been mentioned that the engagement of the tongue 104 in the slot 92 will allow movement of the welding head relative to the carriage in a direction radial to the axis of the drive rings and the means for producing such movement is generally similar to that described above with particular reference to FIGS. 2 and 3. The tongue 104 carries, at its end farthest removed from the axis of the drive rings, a cranked member 130 projecting through an opening 132 in the outer wall of the structure 88. Free arm 134 of the member 130 has a slot 136 that is elongated in a direction parallel to the axis of the drive rings. Through this slot passes one end of the rod 72 for radial movement of the welding head. The member and the rod are attached together for movement in the axial direction of the rod but the slot arrangement allows free movement of the member, and thus the welding head, transverse to the rod; that is to say it allows the oscillatory movement of the head as previously described, while providing a control engagement for the intermittent radially outwards motion at each revolution of the welding head.

It will be appreciated that other arrangements than that earlier described for converting the rotation of the spur wheel 78 to radial movement of the welding head 28 are possible. In particular the rod 72, where it passes through the slot 132 in the cranked member 130 secured to the block may be threaded, the sides of the slot engaging the threads so that the member may be moved axially by rotation of the rod, and yet the slot may move along its length transversely to the rod. The rod in this case passes freely through the end bracket 76 and the spur wheel is secured to the rod. A similar action to that already described takes place when the spur wheel engages the dog-teeth 84 with the exception that the rod 72 rotates and the axial movement is produced at the slot and rod engagement rather than the rod and spur wheel engagement.

The arrangements described are such that oscillation of the head parallel to the axis of the drive rings, and movement of the head radially of the drive rings are possible simultaneously so that a deep, wide weld groove may be filled in a single operation merely by continuous rotation of the two drive rings at different angular velocities.

The embodiments so far described have illustrated the use of the invention in producing a simple welded joint. As FIG. 7 shows, it is possible to construct apparatus according to the invention for the simultaneous welding of two joints, more particularly for the assembly of a U-bend to a pair of parallel tubes. Similar parts to those already described are indicated by the same reference numerals. Clamp 140 now has a bore 142 the upper region of which is of semi-toroidal form to locate a U-bend to be welded. Both ends of the U-bend are welded simultaneously by the two welding heads 28 that operate in parallel on respective drive ring arrangements. A common drive shaft 144 with worms 146 is mounted on one clamp half to rotate with first drive rings 14 and a common shaft 148 with worms 150 on the other clamp half rotates both second drive rings 16.

It should be appreciated that this last example is an illustration of the ability to employ apparatus according to the invention for multiple welding operations. Thus, it will be clear that the apparatus of FIG. 7 can be modified to operate simultaneously upon further return bends or to weld simultaneously a plurality of parallel pairs of abutting straight tubes or, indeed, to deal with any combination of such alternatives.

What we claim and desire to secure by Letters Patent is:

1. Orbital welding apparatus comprising, in combination, a clamp having a bore to embrace a length of tubing and being divided diametrically across said bore, two diametrically divided drive rings mounted on the clamp co-axially therewith and being independently rotatable about the clamp bore axis, a welding head mounted on a first of the rings and feed means to feed a welding wire to the vicinity of said head being drivingly connected to the second of the rings.

2. Apparatus according to claim 1 wherein said feed means is mounted upon the first drive ring to rotate therewith, said apparatus including input drive means operatively engageable with the two drive rings to rotate the respective rings, speed control means being connected to the input drive means and being adjustable to vary the relative angular speed of the two drive rings.

3. Apparatus according to claim 1 wherein the wire feed means comprises a pair of wire guides spaced in series, feed rollers mounted between the guides and arranged to grip the wire, a drive connection being provided from the second drive ring to at least one of the rollers.

4. Apparatus according to claim 1 wherein the drive rings have similar external diameters and are axially spaced on the clamp, a gear-toothed peripheral margin being formed on each ring for the transmission of an input torque thereto.

5. Apparatus according to claim 1 wherein an annular groove or slideway is formed in the clamp to seat one of the drive rings, said one ring having on a face opposite said clamp seating a groove or slideway to receive the other drive ring.

6. Apparatus according to claim 5 wherein the first drive ring is located in said clamp seating and has a groove or slideway to receive the second drive ring, respective external rims of the two rings being axially spaced and being provided with gear teeth for respective drive inputs to the rings.

7. Apparatus according to claim 5 wherein means are provided in a drive input transmission to the second drive ring to vary its speed of rotation and prevent said speed falling below the speed of rotation of the first drive ring.

8. Apparatus according to claim 1 further comprising an adjustable mounting between the welding head and said first drive ring, oscillation drive means to the welding head being arranged to oscillate said head on said mounting longitudinally of the clamp bore.

9. Apparatus according to claim 8 wherein said oscillation drive means comprises a rotary shaft drivingly connected to the second drive ring and cam means interconnecting said shaft and the welding head.

10. Apparatus according to claim 9 wherein said cam means further comprises a series of differently formed cams spaced upon said shaft, adjustment means being provided on said shaft for the interchangeable operative location of respective ones of said series.

11. Apparatus according to claim 10 wherein a slotted follower is secured to the welding head and a series of barrel cams having different eccentricities is secured to the rotary shaft, said shaft passing through the follower slot and being axially displaceable to selectively engage alternative cams with the slot.

12. Apparatus according to claim 1 further comprising a radially adjustable mounting between the welding head and said first drive ring, displacement means mounted between said head and ring to move the head on its mounting radially of the clamp bore, said displacement means being operable in combination with the rotation of the first drive ring.

13. Apparatus according to claim 12 wherein the displacement means are arranged to operate intermittently at each revolution of the first drive ring.

14. Apparatus according to claim 13 wherein the displacement means comprises at least one stationary projection secured adjacent the first drive ring, a wheel rotatably mounted on said ring and engageable by the projection to be rotated thereby, connecting means between the wheel and the welding head whereby said rotation slides the welding head radially outwardly of the clamp bore.

15. Apparatus according to claim 13 further comprising clutch means connected to said displacement means and being operative between successive displacements to hold the welding head at a fixed radial distance from the bore during the intervals between said displacements.

16. Apparatus according to claim 1 arranged to weld a plurality of tubular joints spaced laterally from each other and further characterised in that the clamp has one or more bores to locate the tubing in the required locations for said joints, respective first and second drive rings being arranged on the clamp with their associated welding heads and wire feed means for each weld joint, two common drive input shafts being journalled on the clamp to rotate respectively the first and second drive rings of the plurality of joints.

References Cited

UNITED STATES PATENTS

| | | | |
|---|---|---|---|
| 3,299,245 | 1/1967 | Tinnes | 219—60 |
| 3,266,700 | 8/1966 | Bauer et al. | 228—5 |

RICHARD H. EANES, JR., *Primary Examiner.*